United States Patent
Stevens et al.

(10) Patent No.: US 9,466,954 B1
(45) Date of Patent: Oct. 11, 2016

(54) RACK MOUNTABLE POWER DISTRIBUTION UNITS

(71) Applicant: HEWLETT PACKARD DEVELOPMENT COMPANY, L.P., Houston, TX (US)

(72) Inventors: Matthew E Stevens, Houston, TX (US); Derrick G Runcie, Houston, TX (US)

(73) Assignee: Hewlett Packard Enterprise Development LP, Houston, TX (US)

(*) Notice: Subject to any disclaimer, the term of this patent is extended or adjusted under 35 U.S.C. 154(b) by 0 days.

(21) Appl. No.: 14/726,017

(22) Filed: May 29, 2015

(51) Int. Cl.
*G06F 1/18* (2006.01)
*H02B 1/34* (2006.01)
*H01R 9/22* (2006.01)
*H02B 1/26* (2006.01)

(52) U.S. Cl.
CPC .............. *H02B 1/34* (2013.01); *G06F 1/189* (2013.01)

(58) Field of Classification Search
CPC ...... G06F 1/188; H05K 7/14; H05K 7/1492; H05K 7/20727; H01R 9/22; H01R 13/5812; H01R 13/6395; H01R 25/00; H02B 1/02; H02B 1/26; H02B 1/34; H02B 1/306
USPC ........ 361/622–628, 641–648, 657, 727, 833, 361/836, 601, 602; 307/39, 41, 112–115, 307/38, 125, 126, 141, 141.4, 143; 312/223.2, 223.3, 265.1, 265.3, 265.5; 439/369, 211, 114, 371, 372, 373; 174/48, 49, 70 C, 72 C
See application file for complete search history.

(56) References Cited

U.S. PATENT DOCUMENTS

| | | | | |
|---|---|---|---|---|
| 2,010 A | * | 3/1841 | King | B27F 5/02 144/75 |
| 4,930,047 A | * | 5/1990 | Peterson | H01R 25/003 200/51 R |
| 5,595,494 A | * | 1/1997 | Wiebe | H01R 25/00 174/494 |
| 6,491,539 B1 | * | 12/2002 | Johnston | H01R 13/6395 439/369 |
| 6,628,009 B1 | * | 9/2003 | Chapel | H02J 3/26 307/14 |
| 6,991,495 B1 | * | 1/2006 | Aromin | H01H 83/14 361/42 |
| 7,140,903 B2 | * | 11/2006 | Pulizzi | H01R 13/5804 439/371 |
| 7,141,891 B2 | * | 11/2006 | McNally | G06F 1/206 307/39 |
| 7,324,006 B2 | * | 1/2008 | Godard | H01R 25/00 340/635 |
| 7,455,546 B1 | * | 11/2008 | Yoon | H01R 13/6392 439/369 |
| 7,535,696 B2 | * | 5/2009 | Ewing | H02B 1/306 175/50 |
| 7,542,168 B2 | * | 6/2009 | Goma | G03B 27/72 358/1.9 |
| 7,857,654 B2 | * | 12/2010 | West | H01R 13/6395 439/373 |

(Continued)

OTHER PUBLICATIONS

"Vertical Power Distribution Unit for Integration with Open 2-post or 4-post IT/network Racks, 12-receptacles, 15 Amps," Retrieved from Internet Feb. 13, 2015. 1 p. <http://www.kvmgalore.com/shopping/zero-u-open-rack-pdu-12-15-rct-orps12771515-rackit-p-47285.html >.

*Primary Examiner* — Michail V Datskovskiy
(74) *Attorney, Agent, or Firm* — Hewlett Packard Enterprise Patent Department

(57) ABSTRACT

Example implementations relate to rack mountable power distribution units (PDUs). For example, a PDU includes a plurality of receptacles to couple to power cords of a plurality of computing devices, where each receptacle includes a retention mechanism to hold the power cords in the receptacles. The PDU includes a first set of mounting holes and a second set of mounting holes on either side of the PDU, where the first and second set of mounting holes are to receive a plurality of mounting buttons to mount the PDU to a rack.

15 Claims, 5 Drawing Sheets

(56) References Cited

U.S. PATENT DOCUMENTS

| | | | | |
|---|---|---|---|---|
| 8,066,535 B2* | 11/2011 | Hsiao | ............... | H05K 7/1492 439/719 |
| 8,238,080 B2* | 8/2012 | McGinn | ............... | H05K 7/1492 307/112 |
| 8,418,974 B2 | 4/2013 | Felcman | | |
| 8,605,444 B2* | 12/2013 | Liang | ............... | H05K 7/1491 312/223.2 |
| 8,777,655 B2* | 7/2014 | Blanton | ............... | H01R 13/6392 439/372 |
| 8,797,751 B2* | 8/2014 | Peng | ............... | H05K 7/1492 174/50 |
| 8,817,463 B1* | 8/2014 | Rose | ............... | G06F 1/189 174/500 |
| 9,030,810 B2* | 5/2015 | Ehlen | ............... | H05K 7/1432 361/622 |
| 9,054,449 B2* | 6/2015 | Utz | ............... | H01R 13/5812 |
| 9,141,154 B2* | 9/2015 | Champion | ............... | G06F 1/189 |
| 9,209,622 B2* | 12/2015 | Wishman | ............... | G06F 1/26 |
| 9,252,537 B2* | 2/2016 | Cox | ............... | H01R 13/639 |
| 2004/0231875 A1* | 11/2004 | Rasmussen | ............... | G06F 1/189 174/50 |
| 2005/0068716 A1* | 3/2005 | Pereira | ............... | G06F 1/189 361/624 |
| 2005/0259383 A1* | 11/2005 | Ewing | ............... | H02B 1/306 361/622 |
| 2006/0264087 A1* | 11/2006 | Woellner | ............... | H01R 13/639 439/371 |
| 2007/0159775 A1* | 7/2007 | Ewing | ............... | H02B 1/306 361/642 |
| 2007/0217128 A1* | 9/2007 | Johnson | ............... | H05K 7/1492 361/622 |
| 2008/0198536 A1* | 8/2008 | Ewing | ............... | H02B 1/306 361/622 |
| 2008/0258026 A1 | 10/2008 | Smith | | |
| 2010/0127141 A1 | 5/2010 | Chan | | |
| 2012/0014040 A1* | 1/2012 | McGinn | ............... | H05K 7/1492 361/601 |
| 2012/0061536 A1* | 3/2012 | Felcman | ............... | G06F 1/188 248/220.22 |
| 2013/0188309 A1* | 7/2013 | Ross | ............... | H05K 7/20727 361/679.48 |
| 2013/0196532 A1* | 8/2013 | Utz | ............... | H01R 13/5812 439/471 |
| 2014/0060915 A1* | 3/2014 | Liang | ............... | H05K 7/1492 174/520 |
| 2014/0070679 A1 | 3/2014 | Liang | | |
| 2014/0118886 A1 | 5/2014 | Ehlen | | |
| 2014/0160637 A1 | 6/2014 | Liu | | |
| 2014/0168892 A1* | 6/2014 | Liang | ............... | G06F 1/181 361/679.58 |
| 2015/0222047 A1* | 8/2015 | Utz | ............... | H01R 13/5812 439/471 |

* cited by examiner

RACK MOUNTABLE POWER DISTRIBUTION UNITS

BACKGROUND

Computing centers such as data centers generally include a large number of computing devices. The computing devices can include, for example, servers, switches, routers, storage systems, and the like. A rack may provide a standardized structure to support and mount the computing devices. A power distribution unit (PDU) can also be mounted on the rack to provide electrical power to the computing devices.

BRIEF DESCRIPTION OF THE DRAWINGS

Some examples of the present application are described with respect to the following figures.

DETAILED DESCRIPTION

Figure 1:
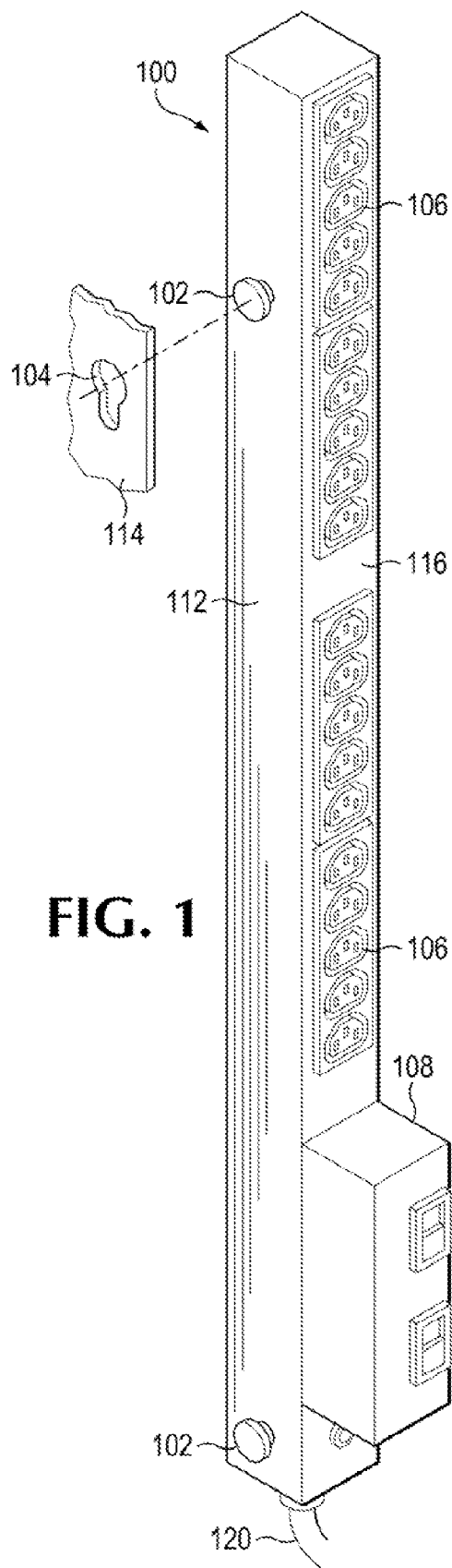
FIG. 1 is a perspective view of an example power distribution unit (PDU), including mounting buttons on a left side of the PDU.

Examples disclosed herein relate to rack mountable power distribution units (PDUs). In addition to computing devices mounted in a rack, a PDU can also be mounted in a rack to provide power to the computing devices. The computing devices can have power cords that are each plugged into the power outlets (or receptacles) of the PDU. The PDU can include circuitry to convert alternating current (AC) power to direct current (DC) power for the computing devices. The PDU can also include a circuit breaker for the power outlets/receptacles to protect the computing devices from damages caused by overload or short circuit, by interrupting current flow to the computing devices. A PDU can be vertically mounted in the rear of the rack to avoid taking space in the rack, where the computing devices can be mounted. An equipment or computing device mounted in the rear portion of the rack is referred to as a "zero U", as it takes up no space in the rack. Rack-mountable computing devices and equipment are measured in standard heights of 1.75 inches, referred to as "rack unit" or a "U." In some scenarios, a PDU can be a zero U device when it is mounted in the rear of a rack and does not take up space in the rack.

Conventional vertical zero U PDUs mount onto the rack on the back of the PDU. For example, typical PDUs include mounting members on the back of the PDU (i.e., opposite the front side including the outlets/receptacles) to engage with corresponding mounting members on the rack such that the outlets/receptacles are positioned facing in towards the center of the rack. Such a mounting scheme can interfere with the serviceability of rack installed computing devices. For example, because the outlets/receptacles and breaker box (a protruding portion of the PDU) are facing in toward the center of the rack, access to computing devices mounted in the rack via the back may be difficult and may require removal of the PDU and/or the computing devices. This may be time consuming and may result in lost or damaged equipment as mounting connectors may be lost or dropped or equipment may be damaged during handling.

The described examples can address the above challenges by providing mounting features on the sides (i.e., left and right sides) of the vertical zero U PDU to enable the PDU to be vertically mounted on its side (versus on its back) which would keep the PDU chassis including the breaker box out of the serviceability area in the back of the rack. By mounting the PDU on its sides, the outlets/receptacles and breaker box can face the front or back of the rack, depending on which of the rear columns of the rack the PDU is mounted on, thereby keeping the PDU from facing in towards the center of the rack and away from the serviceability area of the rack. In addition, the described examples provide a power cord retention mechanism for the receptacles (i.e., power outlets) to securely hold the power cords in the receptacles and prevent the power cords from being accidentally removed from the receptacles. The power cord retention mechanism can be a resistive mechanism or a locking mechanism. In certain examples, the retention mechanism can be integrated to the receptacles, and in other examples, the retention mechanism can be engaged to lock with cords onto the receptacles.

In one example, a PDU includes a plurality of receptacles to couple to power cords of a plurality of computing devices, where each receptacle includes a retention mechanism to hold the power cords in the receptacles. The PDU includes a first set of mounting holes and a second set of mounting holes on either side of the PDU, where the first and second set of mounting holes are to receive a plurality of mounting buttons to mount the PDU to a rack.

In another example, a PDU includes a plurality of power outlets on a front side of the PDU, the power outlets to provider power to a plurality of computing devices connected to the outlets via respective power cords, where each power outlet includes a power cord retention mechanism to securely hold the power cords in the outlets. The PDU includes a block member protruding from the front side of the PDU, the block member including a circuit breaker box for the power outlets. The PDU also includes a first set of mounting holes on a left side of the PDU to receive mounting buttons to mount the PDU to a rack enclosure, and a second set of mounting holes on a right side of the PDU to receive the mounting buttons to mount the PDU to the rack enclosure.

In another example, a rack enclosure includes a rack comprising vertical rack columns and a PDU. The PDU includes a plurality of power outlets on a front side of the PDU, the power outlets to provide power to a plurality of computing devices connected to the outlets via respective power cords, where each power outlet includes a cord retention mechanism to securely hold the power cords in the outlets. The PDU includes a block member on the front side of the PDU, where the block member includes a circuit breaker box. The PDU also includes a first set of mounting holes on a left side of the PDU, a second set of mounting holes on a right side of the PDU, and a plurality of mounting buttons removably attachable to the first set of mounting holes or to the second set of mounting holes. The mounting buttons are to removably mount the PDU to a back vertical column of the rack.

Referring now to the figures, FIG. 1 is a perspective view of an example power distribution unit (PDU), including mounting buttons on a left side of the PDU. PDU 100 includes a left side 112 (or left surface) with mounting buttons 102 removably inserted into the mounting holes (not shown) of the PDU 100. Mounting buttons 102 include any connectors or mounting features to engage with corresponding mounting features 104 on a vertical rack column 114 (or vertical rack surface) of a rack. Each mounting feature 104 can be an opening, recess, or cavity in the vertical rack column 114, to receive the mounting buttons 102. In some examples, each mounting feature 104 may include a circular recess and a slot, such that a mounting button 102 can be inserted into the circular recess and slid along the slot to secure the mounting button 102 within the mounting feature 104.

PDU 100 can include a plurality of receptacles 106 (or power outlets) on a front side 116 (or front surface) to removably plug in power cords of computing devices of the rack to provide power to the computing devices. Computing devices can include rack-mountable computing devices such as servers, networking devices, storage devices, etc. PDU 100 can also include a breaker box 108. Breaker box 108 can include one or more circuit breakers 118 to protect the computing devices from damage caused by overload or short circuit. In the example of FIG. 1, PDU 100 can be mounted on its side onto a rack via the mounting buttons 102 on the left side 112 of the PDU 100, compared to being mounted on its back. By mounting the PDU 100 on its side, the body of the PDU 100 (including its receptacles 106 with power cords plugged thereto and the breaker box 108) can be kept out of the serviceability area within the back of the rack.

Figure 2:
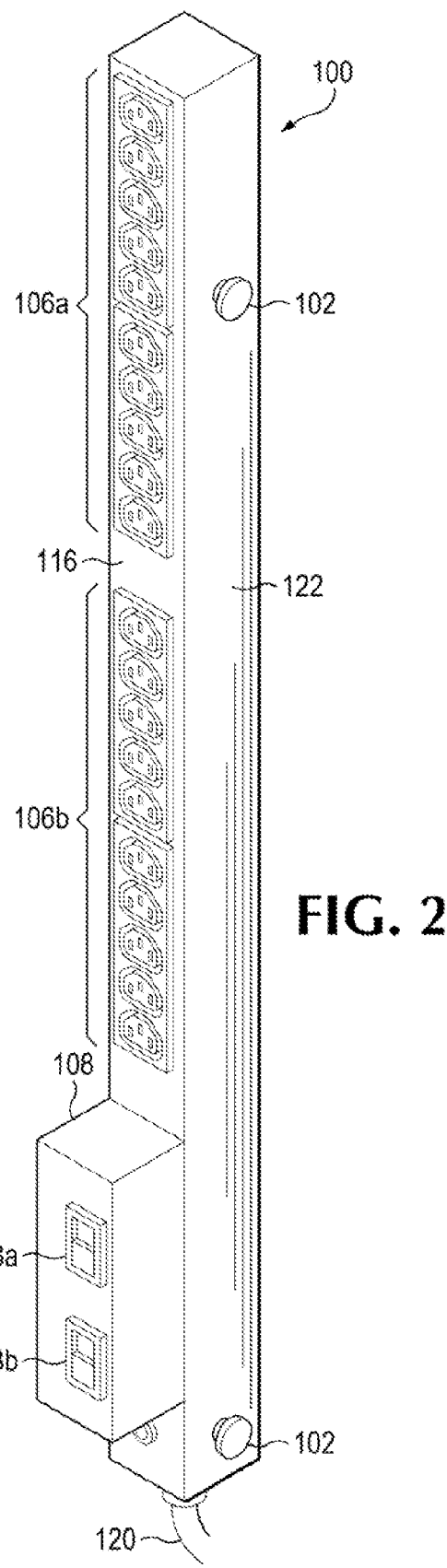
FIG. 2 is a perspective view of an example PDU, including mounting buttons on a right side of the PDU.

FIG. 2 is a perspective view of an example PDU, including mounting buttons on a right side of the PDU. In the example of FIG. 2, the mounting buttons 102 are located on a right side/surface 122 of the PDU 100. Mounting buttons 102 can removably engage with mounting features 104 on a vertical rack column 114 of the rack.

PDU 100 includes a first set of receptacles 106a and a second set of receptacles 106b on a front side/surface 116 of the PDU 100. The first and second set of receptacles 106a and 106b are to receive power cords of the computing devices to provide power from the PDU 100 to the computing devices. Each receptacle 106 can be a standard power outlet for receiving a standard plug. For example, in the case of a server rack or data center power system, each power receptacle 106 may be a standard C19 or C13 outlet configured to receive a standard C14 or C20 plug.

PDU 100 includes a breaker box 108. Breaker box 108 can include a first circuit breaker 118a and a second circuit breaker 118b, corresponding to the first set of receptacles 106a and second set of receptacles 106b, respectively. PDU 100 can also include a power cord 120 for providing power to the PDU 100. PDU 100 can also be communicatively coupled to an administrator computing device (not shown) within or external to the rack. The administrator computing device enables a user to monitor and control the power delivered to the rack and rack-mounted devices through to the PDU 100. The PDU 100 can be coupled to the administrator computing device through a direct connection or through a network, which may be a local area network (LAN), wide area network (WAN), a storage area network (SAN), or other suitable types of networks.

In the example of FIG. 2, PDU 100 can be mounted on its side onto a rack via the mounting buttons 102 on the right side 122 of the PDU 100, compared to being mounted on its back. By mounting the PDU 100 on its side, the body of the PDU 100 (including its receptacles 106 with power cords plugged thereto and the breaker box 108) can be kept out of the serviceability area within the back of the rack.

Figure 3:
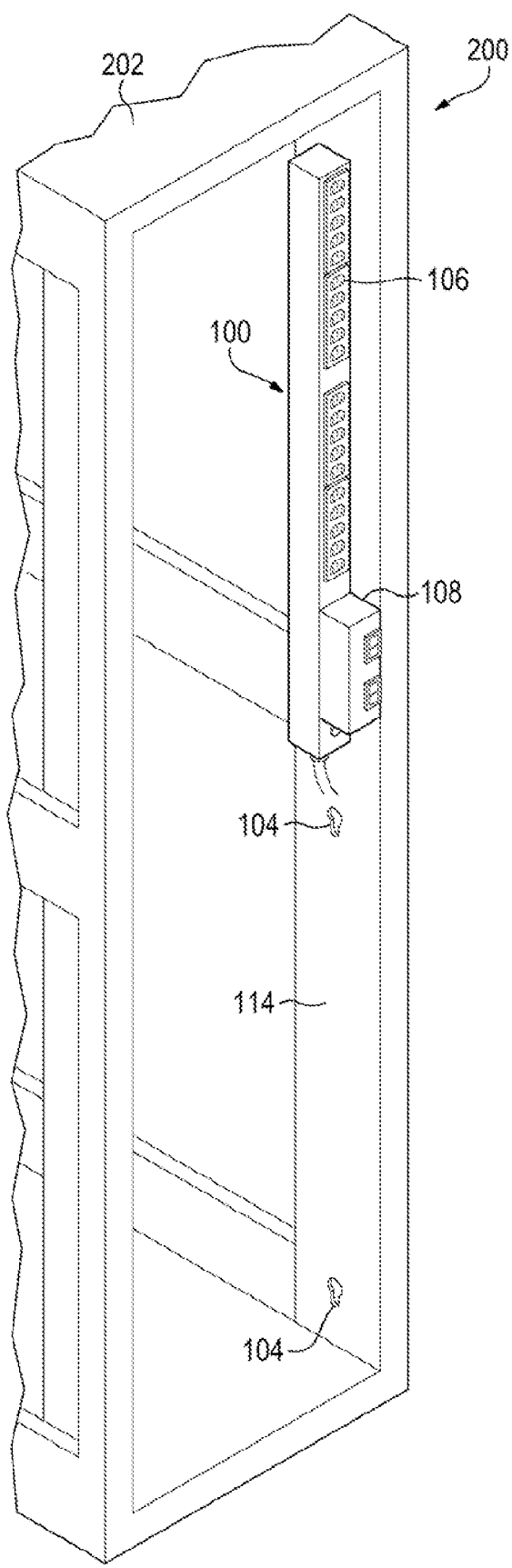
FIG. 3 is a perspective view of an example PDU mounted on a rack.

FIG. 3 is a perspective view of an example PDU mounted on a rack. As used herein, a rack is a frame used to mount various computing devices such as servers, switches, routers, and other computing devices. The rack may include rack columns located at the four corners of the rack where openings may separate the rack columns. The insertion of side panels in the openings between the rack columns may convert the rack into a rack enclosure.

In the example of FIG. 3, rack enclosure 200 can include a rack 202 and a PDU 100 mounted onto a vertical rack column 114 of the rack 202 via mounting features 104. Mounting features 104 can be an opening, a recess, or a cavity on the vertical rack column 114 of the rack 202. Accordingly, the mounting buttons 102 of the PDU 100 can engage with the mounting features 104 to vertically mount the PDU 100 onto the rack 202. As shown in FIG. 3, the PDU 100 is mounted on the top part of one of the two rear (or back) vertical rack columns 114 of the rack 202. In other examples, the PDU 100 can be mounted on the top or bottom of another of the two rear vertical rack columns 114 of the rack 202. In the example of FIG. 3, the PDU 100 is mounted on its right side 122 such that the body of the PDU 100, including the receptacles 106 and the breaker box 108, is facing the rear of the rack 202 and is out of the serviceability area of the rack 202.

Figure 4:
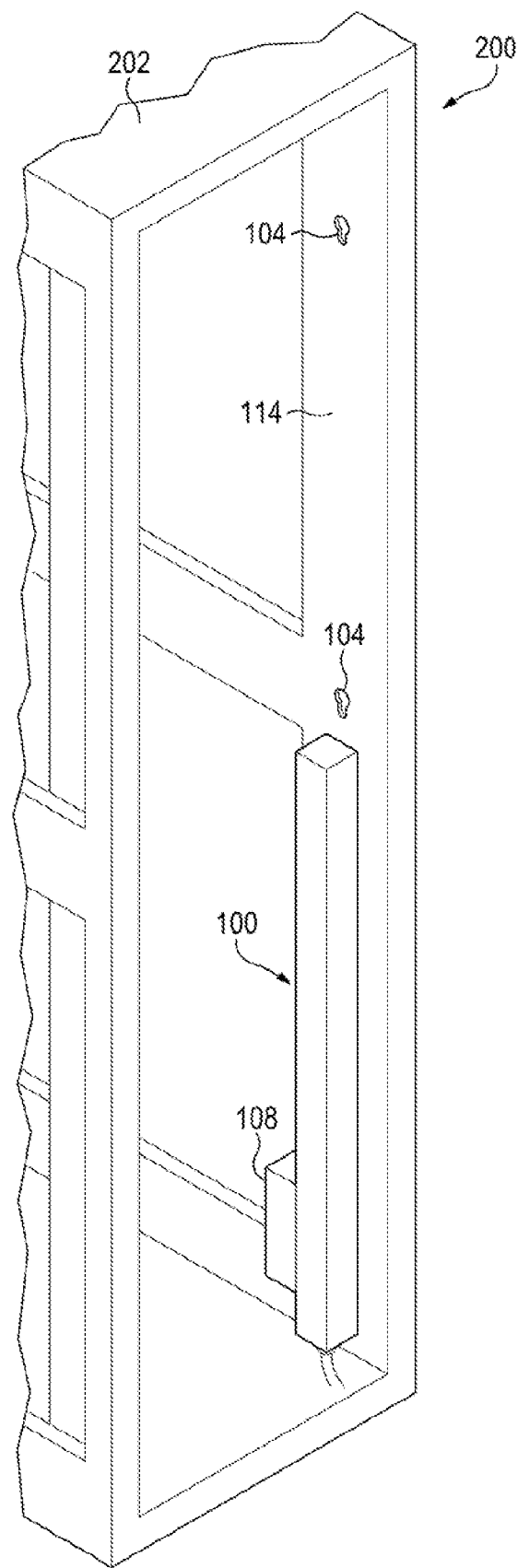
FIG. 4 is a perspective view of an example PDU mounted on a rack.

FIG. 4 is a perspective view of an example PDU mounted on a rack. In the example of FIG. 4, the PDU 100 is mounted in the bottom portion of the rear vertical rack column 114 of the rack 202. In this example, the PDU 100 is mounted on its left side 112 such that the body of the PDU 100, including the receptacles 106 and the breaker box 108, is facing the front of the rack 202 and is away from the serviceability area of the rack 202.

Figure 5:
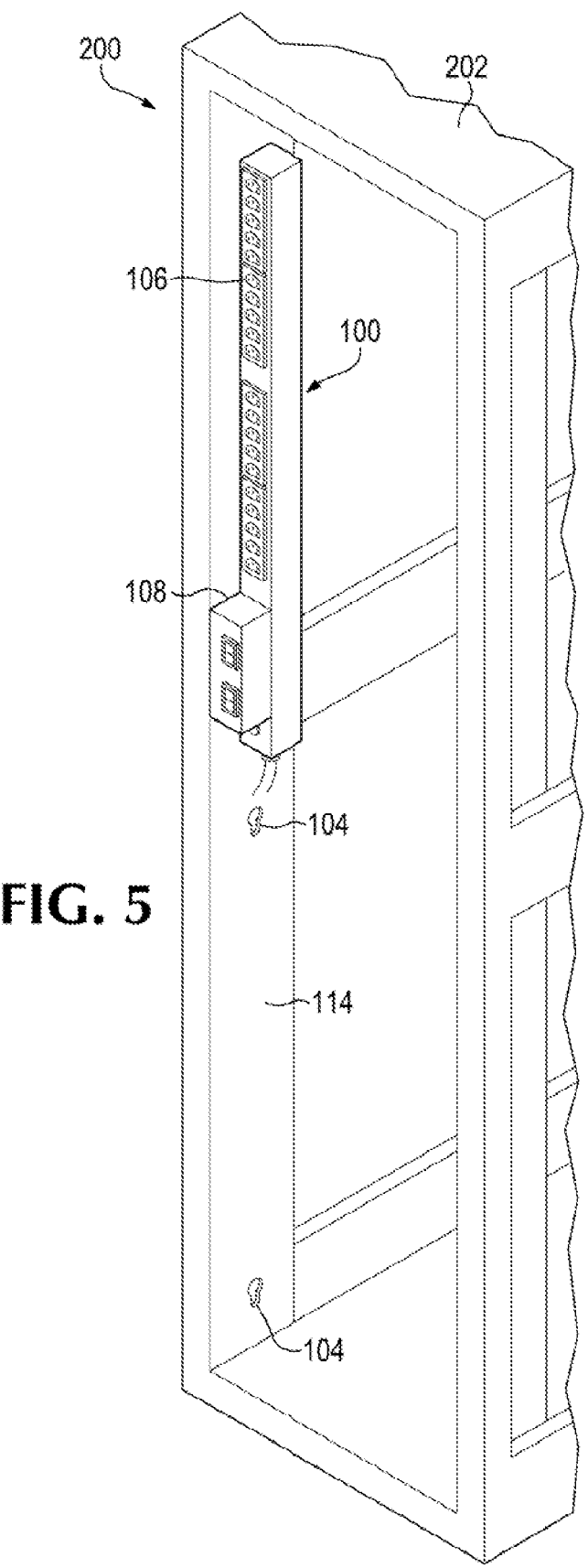
FIG. 5 is a perspective view of an example PDU mounted on a rack.

FIG. 5 is a perspective view of an example PDU mounted on a rack. In the example of FIG. 5, the PDU 100 is mounted in the top portion of one of the two rear vertical rack columns 114 of the rack 202. In this examples, the PDU 100 is mounted on its left side 112 such that the body of the PDU 100, including the receptacles 106 and the breaker box 108, is facing the rear of the rack 202 and is away from the serviceability area of the rack 202.

Figure 6:
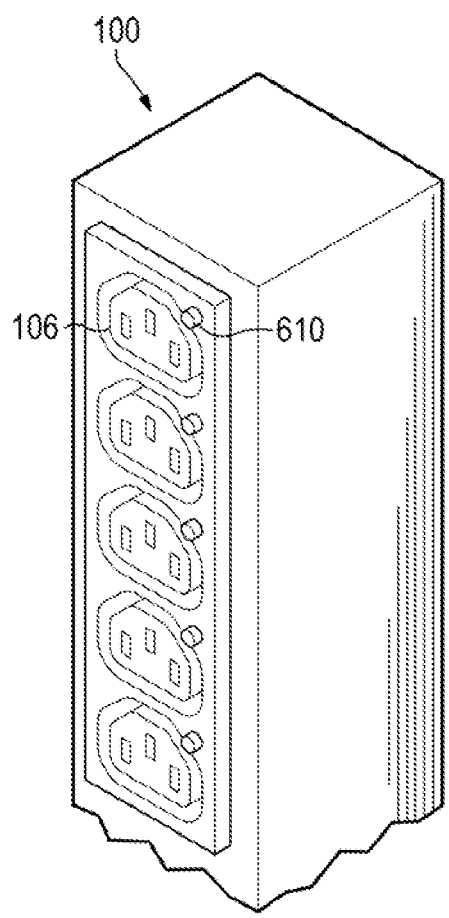
FIG. 6 is a perspective view of an example PDU with power receptacles having a retention mechanism to hold power cords in the receptacles.

FIG. 6 is a perspective view of an example PDU with power receptacles having a retention mechanism to hold power cords in the receptacles. PDU 100 can include a retention mechanism 610 for each receptacle 106 to securely hold the power cords in the receptacle 106. In certain examples, retention mechanism 610 can be a push button. In such an example, when a power cord is plugged into one of the receptacles 106, the push button engages with the power cord inside the receptacle 106 causing the outer portion of the push button to push up or outwards, towards the surface. To remove the power cord from the receptacle 106, a significant amount of force may be needed to depress the push button thereby releasing the power cord. In various examples, the retention mechanism 610 can be a resistive mechanism or a locking mechanism to prevent the power cords from being accidentally removed from the receptacles 106.

Figure 7:
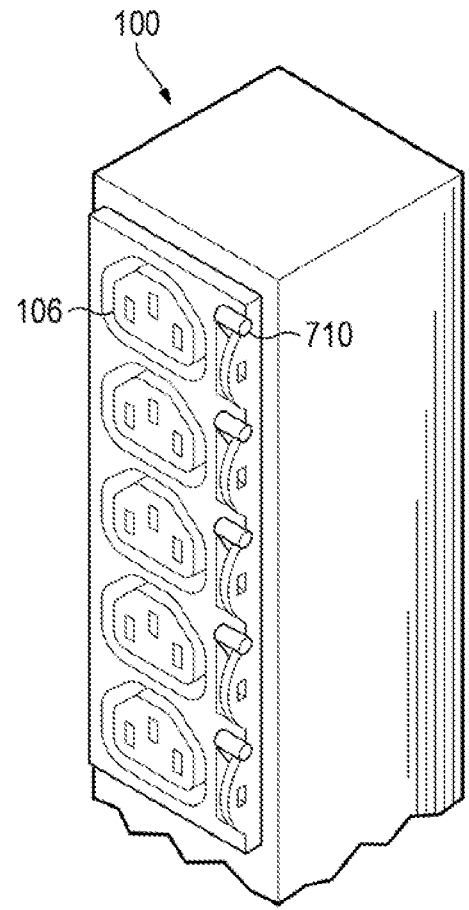
FIG. 7 is a perspective view of an example PDU with power receptacles having a retention mechanism to hold power cords in the receptacles.

FIG. 7 is a perspective view of an example PDU with power receptacles having a retention mechanism to hold power cords in the receptacles. In the example of FIG. 7, the retention mechanism 710 can be a locking device that can be engaged to lock the cords onto the receptacles 106. For example, the retention mechanism 710 can be a lever that can be engaged to hold the cords in place within the receptacles 106. The lever can be moved in one direction to lock in the cords when plugged in and be moved in the other direction to release the cords before unplugging. In various examples, the retention mechanism 610 can be a resistive mechanism or a locking mechanism to prevent the power cords from being accidentally removed from the receptacles 106.

What is claimed is:

1. A power distribution unit (PDU), comprising:
   a plurality of receptacles to couple to power cords of a plurality of computing devices, wherein each receptacle includes a retention mechanism to hold the power cords in the receptacles; and
   a first set of mounting holes and a second set of mounting holes on either sides of the PDU, wherein the first and second set of mounting holes are to receive a plurality of mounting buttons to mount the PDU to a rack.

2. The PDU of claim 1, wherein the retention mechanism is a resistive mechanism or a locking mechanism to prevent accidental removal of the power cords from the receptacles.

3. The PDU of claim 1, wherein the mounting buttons are installed on a side of the PDU that mounts to the rack and wherein the mounting buttons are to engage with a plurality of vertical mounting features in the rack such that the PDU can be mounted on a vertical surface of the rack.

4. The PDU of claim 3, wherein the vertical mounting features comprise an opening, a recess, or a cavity on the vertical surface of the rack.

5. The PDU of claim 3, wherein the PDU is to be oriented in a vertical manner when the buttons are engaged with the vertical mounting features.

6. The PDU of claim 1, wherein the PDU includes a block member protruding from a front side of the PDU and below the plurality of receptacles and wherein the block member includes a circuit breaker box.

7. A power distribution unit (PDU), comprising:
   a plurality of power outlets on a front side of the PDU, the power outlets to provide power to a plurality of computing devices connected to the outlets via respective power cords, wherein each power outlet includes a power cord retention mechanism to securely hold the power cords in the outlets;
   a block member protruding from the front side of the PDU, the block member including a circuit breaker box for the power outlets;
   a first set of mounting holes on a left side of the PDU to receive mounting buttons to mount the PDU to a rack enclosure; and
   a second set of mounting holes on a right side of the PDU to receive the mounting buttons to mount the PDU to the rack enclosure.

8. The PDU of claim 7, wherein the mounting buttons are removably coupled to the first or second set of mounting holes of the PDU based on a mounting position of the PDU relative to the rack enclosure.

9. The PDU of claim 7, wherein the power cord retention mechanism is at least one of a resistive mechanism and a locking mechanism to attach the power cords to the power outlets.

10. The PDU of claim 7, wherein the mounting buttons are to engage with mounting features on the rack enclosure such that the PDU is oriented in a vertical manner, and wherein the mounting features include an opening, a recess, or a cavity on a surface of the rack enclosure to engage with the mounting buttons.

11. The PDU of claim 7, wherein the PDU is mounted to the rack enclosure on the left side or the right side of the PDU such that the PDU is substantially away from a serviceability area at a back of the rack enclosure.

12. The PDU of claim 7, wherein the PDU is mounted to the rack enclosure on the left side or the right side of the PDU such that the power outlets of the PDU are facing a front or a back of the rack.

13. A rack enclosure, comprising:
   a rack comprising vertical rack columns; and
   a power distribution unit (PDU), comprising:
      a plurality of power outlets on a front side of the PDU, the power outlets to provide power to a plurality of computing devices connected to the outlets via respective power cords, wherein each power outlet includes a cord retention mechanism to securely hold the power cords in the outlets;
      a block member on the front side of the PDU, wherein the block member includes a circuit breaker box;
      a first set of mounting holes on a left side of the PDU and a second set of mounting holes on a right side of the PDU; and
      a plurality of mounting buttons removably attachable to the first set of mounting holes or to the second set of mounting holes, wherein the mounting buttons are to removably mount the PDU to a back vertical rack column of the rack.

14. The rack enclosure of claim 13, wherein the mounting buttons are to engage with mounting features on the back vertical column of the rack such that the PDU is oriented in a vertical manner.

15. The rack enclosure of claim 14, wherein the mounting features includes an opening, a recess, or a cavity on a surface of the back vertical rack column to engage with the mounting buttons of the PDU.

* * * * *